March 8, 1927.  
E. C. SENDELBACH  
WOOD DISK WHEEL  
Filed May 28, 1925
1,620,398
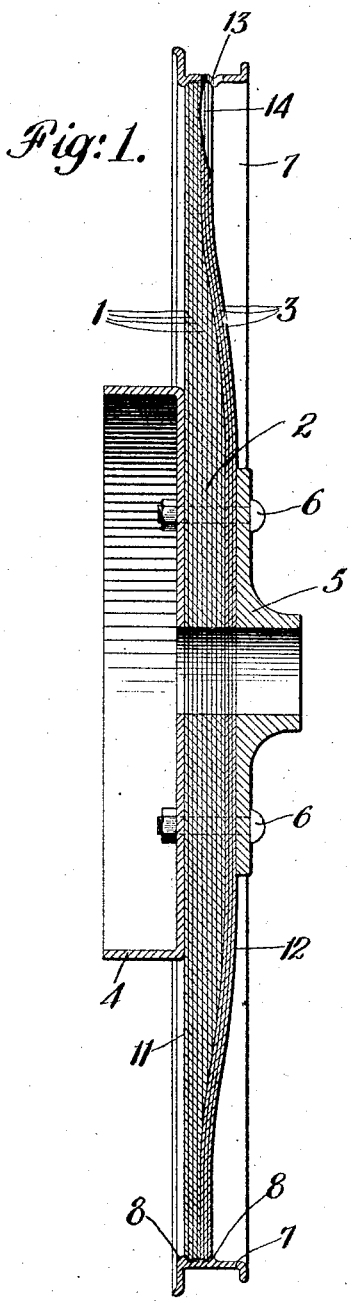
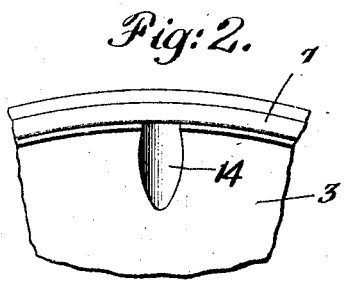
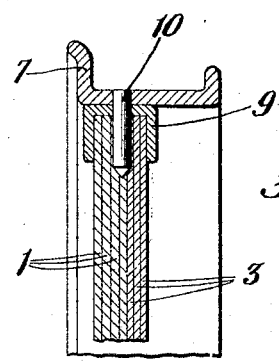
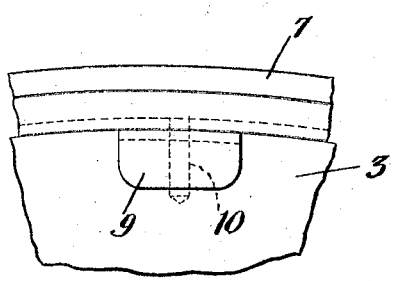
INVENTOR  
Edward C. Sendelbach  
BY  
ATTORNEYS Patented Mar. 8, 1927.

1,620,398

UNITED STATES PATENT OFFICE.

EDWARD C. SENDELBACH, OF PHILADELPHIA, PENNSYLVANIA.

WOOD DISK WHEEL.

Application filed May 28, 1925. Serial No. 33,343.

This invention relates to wood disk wheels and particularly to laminated wheels and it is especially useful for automobile wheels, in connection with which the invention was developed. The general objects of the invention are the provision of a wood disk wheel which will be sufficiently strong to meet all requirements, one which can be readily accommodated to felloes, bands, and other wheel equipment, of different sizes and finally one which is easily manufactured.

More specific objects of the invention might be stated as involving the provision of a laminated wood disk wheel in which none of the glued joints of such laminations are exposed to the weather and one which has no dirt or water collecting pockets; the provision of a laminated wood disk wheel which presents the necessary flat faces for the brake drum and the hub, while at the same time presenting a curved contour, preferably convex; the provision of a wheel which is extremely flexible, yet one which will not break under strains, nor assume a "set" which will cause wobbling in service; the provision of a wheel which is amply strong in the center or hub portion, yet flexible as specified near the rim portion and braced from the hub to the rim; the provision of a wheel which will not "rumble" in service, particularly when used on closed automobiles.

The foregoing objects, together with such other objects as are incident to my invention, or may appear hereinafter, are obtained by means of a construction which is illustrated in preferred form in the accompanying drawings, wherein—

Fig. 1 is a cross section of my improved wheel;

Fig. 2 is a partial face view near the rim showing the manner in which access is had to the valve stem of the tube;

Fig. 3 is a partial sectional view similar to Fig. 1 but illustrating a modified form of securing means for the steel felloe; and Fig. 4 is a fragmentary face view similar to Fig. 2 but illustrating the modified structure of Fig. 3.

Referring to the drawings it will be seen that the body structure of my wheel comprises a series of straight laminations 1 certain of which toward the front face of the wheel are of gradually decreasing diameter to provide a thickened hub portion 2. Against the graduated surface of the face thus produced I fit snugly a series of curved laminations 3 which present a convex face to the outside of the wheel and which cover up all joints on the straight laminations immediately below. For a wheel of average size and for average capacity the nine straight laminations illustrated plus the three curved or convex laminations constitute a very desirable wheel as to shape, size and strength. It is perfectly apparent however that the number of straight laminations can be varied to suit individual conditions and also the number of curved laminations. If it is desired to have a thicker heavier wheel more straight laminations could be used without necessarily increasing the number of curved laminations although these also might be increased in number up to a certain point determined by the flexibility of the wood being used.

All of these laminations are built up and glued together in any way familiar to the laminated or ply wood art the details of which it is unnecessary to go into in the present application.

To the rear face of the wheel is applied the brake drum 4 and to the front face the hub member 5. I have illustrated bolts 6 passing through all of these members and serving to hold the entire wheel together as a unit. It will be noted that the straight laminations at the rear provide a flat face for the drum and that the outer surface is also made with a flat face for the application of the hub member 5.

The steel felloe 7 is made originally slightly larger than necessary and is then heated in order to expand it. The wooden part of the wheel is then introduced and the felloe is compressed or upset inwardly upon a large upsetting machine the details of which it is also unnecessary to illustrate or describe since it forms no part of my invention. The felloe is provided with two annular ribs 8 which fit one on each side of the laminated portion of the wheel and securely hold it in place. Any suitable type of rim familiar to the art may be applied to the felloe 7.

In Figs. 3 and 4 I have illustrated a modified form of securing means for the felloe which does not involve the use of an upsetting machine. A series of saddle or clip members 9 are fitted over the rim of the wooden laminations and suitably countersunk to present a flush surface. Headless pins 10 extend down from the felloe 7 through these saddle members into the wood of the wheel. Lateral thrusts on the felloe are therefore taken by the flat surface of the saddle members which rest against the faces of the laminations as clearly shown in the drawing.

It will be seen that my wheel is composed primarily of two main sections the section or disk 11 made up of the straight laminations and the section or disk 12 made up of the curved or convex laminations. The curved section or disk serves to cover up the joints of the straight section as well as to brace the rim of the wheel. The wheel is extremely flexible and yet will never take a permanent "set" from a bad bump in service. Wobbling is therefore eliminated with its incidental wear on tires. The wheel will not rumble particularly on closed cars. It presents a pleasing surface and one which is easy to finish and wash. The valve stem of the tube is designed to project through the hole 13 in the felloe arranged over a hollowed or scooped out portion 14 in the front face of the wheel in order to provide ready access for purposes of tire inflation.

The wheel is extremely simple and easy to build and the body structure is of such a character that it can be readily varied to suit different types and sizes of wheels.

I wish to call attention to the fact that my improved wheel and especially the outer curved section thereof might be constructed of some fibrous material not strictly known as wood and yet the substantial equivalent thereof and the term "wood disk" as used in this specification and in the appended claims is intended to be broad enough to include such material.

I claim:

1. In a laminated wood disk wheel, the combination of a section built up of straight laminations certain of which are of gradually decreasing diameter to provide a central hub portion of greater thickness than the outer portion, and another section built up of laminations curved to fit snugly over the graduated thickness of said straight laminations whereby to protect the joints and brace the wheel.

2. In a wood disk wheel, the combination of a body section of straight laminations built up to provide a thickened hub, and a facing section of curved laminations bracing said body section.

3. In a wood disk wheel, the combination of a section of straight laminations with thickened hub and a facing section of curved laminations fitting snugly against the surface of said first section.

4. In a wood disk wheel, the combination of a plurality of straight laminations of different diameters built up in stepped relation to provide a thickened hub portion, and a plurality of curved laminations formed to fit over the graduated face presented by said stepped laminations to brace the wheel and protect the joints at the steps.

5. In a wood disk wheel, the combination of a plurality of laminations forming one section of the wheel with one face graduated from the periphery to a thickened hub portion, and a plurality of laminations forming a second section curved to fit snugly over the graduated face of the first section whereby to brace the wheel.

6. In a wood disk wheel, the combination of an inner section of straight laminations built up to a greater thickness at the hub by gradually decreasing the diameter of the laminations on one side of the section, and an outer section of curved laminations formed to fit snugly against the graduated face of the first section.

In testimony whereof, I have hereunto signed my name.

EDWARD C. SENDELBACH.